Jan. 4, 1949.　　　H. G. BAUER　　　2,458,330
SWINGING HITCH
Filed June 5, 1946　　　　　　　　　2 Sheets-Sheet 1
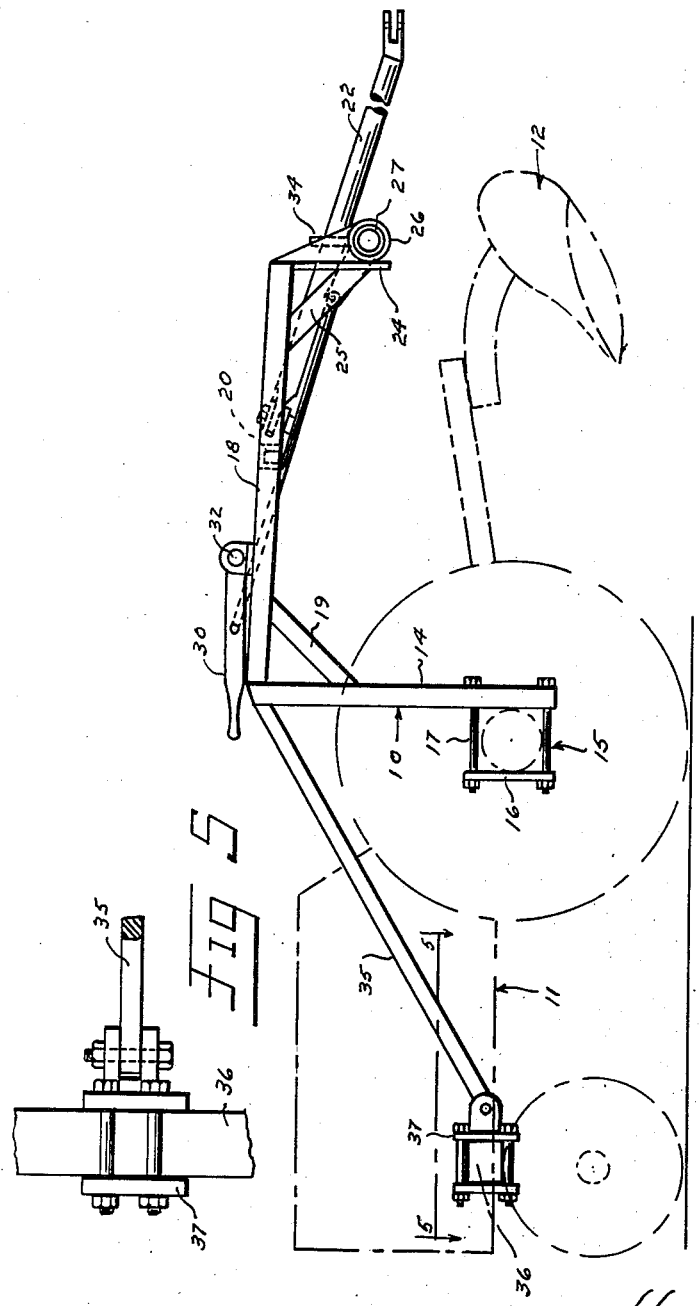
Inventor
Harold G. Bauer
By
Kimmel & Crowell Attorneys Jan. 4, 1949.                    H. G. BAUER                    2,458,330
                                SWINGING HITCH
Filed June 5, 1946                                          2 Sheets-Sheet 2
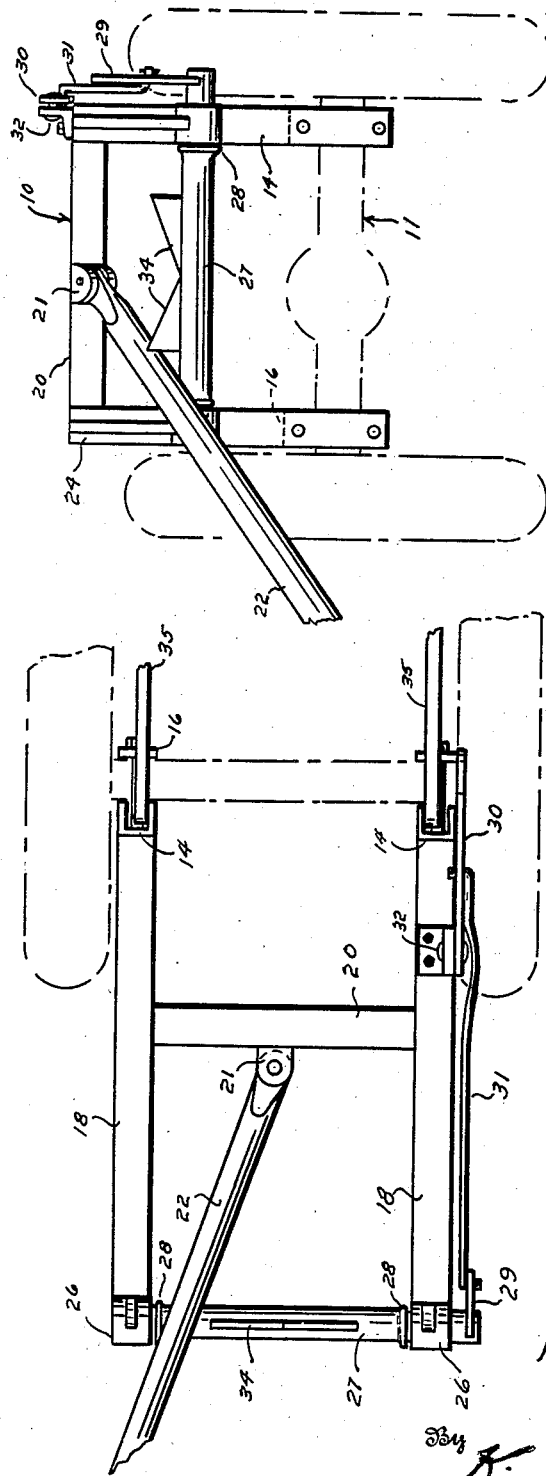
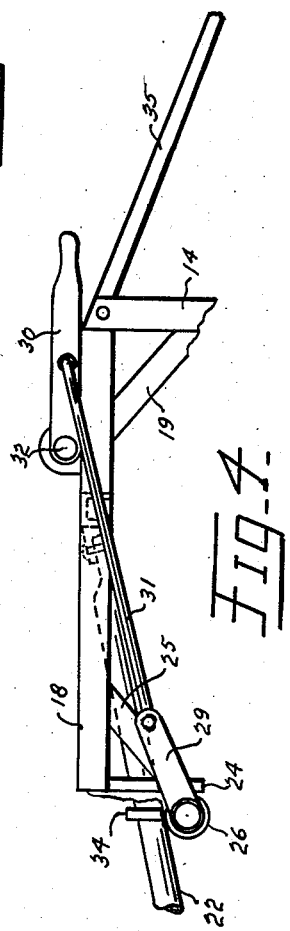
Inventor
Harold G. Bauer
By Kimmel & Crowell Attorneys Patented Jan. 4, 1949

2,458,330

UNITED STATES PATENT OFFICE 2,458,330

SWINGING HITCH

Harold George Bauer, Eden, Idaho

Application June 5, 1946, Serial No. 674,599

5 Claims. (Cl. 280—33.44)

1

This invention relates to attachments for tractors.

An object of this invention is to provide an attachment for tractors whereby a harrow may be coupled to the tractor at the same time as a plow is attached thereto, so that the ground may be plowed and harrowed in a single operation.

Another object of this invention is to provide an attachment of this kind wherein a harrow is coupled to a tractor and is disposed laterally of the line of travel so that such lateral ground may be harrowed without forming wheel tracks and without again running the tractor over the ground.

A further object of this invention is to provide an attachment of this kind which is so constructed and arranged that the harrow may be disposed on either side of the tractor so as to harrow the ground previously plowed on the previous pass of the plow or plows.

A further object of this invention is to provide an attachment of this kind which can be mounted on a tractor and when so mounted will not interfere with the mounting and operation of one or more plows so that the plowing and harrowing operations can be performed simultaneously.

A further object of this invention is to provide an attachment of this kind which is of relatively simple construction and can be mounted on and removed from the tractor in a short time and without changing the present parts of the tractor.

With the above and other objects in view, my invention consists in the arrangement, combination and details of construction disclosed in the drawings and specification, and then more particularly pointed out in the appended claims.

In the drawings, wherein similar reference characters designate similar parts throughout the respective views, Figure 1 is a side elevation of an attachment constructed according to an embodiment of my invention, Figure 2 is a plan view, partly broken away, Figure 3 is a rear elevation, Figure 4 is a fragmentary side elevation, partly broken away, showing the lock control lever, Figure 5 is a detail section taken on the line 5—5 of Figure 1.

Referring to the drawings, the numeral 10 designates generally a frame which is adapted to pivotally support a harrow behind and to the side of a tractor 11 having attached thereto a plow or plows 12. The frame 11 is formed of a pair of vertical side members 14, which are preferably made of strips of U-shaped channels or angle

2 irons. The vertical members 14 are adapted to be secured to the tractor 11 at their lower ends by clamps 15 about the fixed rear axle housing of the tractor 11. The clamps may consist of a plate 16 secured to the axle on the opposite side from the members 14 and connected to the members 14 by bolts 17 above and below the axle. Fixed to the upper end of the vertical frame members 14, by welding or other suitable fastening means, are a pair of rearwardly extending horizontal members 18, also formed of channeled section strips. The horizontal members 18 are further supported on the vertical members 14 by short diagonal braces 19.

Fixed between the horizontal members 18 is a transverse frame member 20 intermediate the length of the members 18 and at right angles thereto. Midway between the members 18 on the rear side of the U-shaped member 20 a pair of vertically spaced apart apertured ears 21 are secured. A harrow drawbar 22 is pivotally connected to the frame 10 between the ears 21. A flat frame member 24 is fixed to the rear and of each horizontal member 18 and extends downwardly therefrom. A diagonal strengthening member 25 further supports the member 24 to the horizontal member 18.

Fixed to the lower end of, and on the rear side of each member 24 there is mounted a bearing 26 for rotatably supporting therebetween a horizontal lock bar 27 which may be a tube or rod. The lock bar 27 extends through and slightly beyond one of the bearings 26 and is formed with spaced apart annular ribs 28 which engage the inner side of their respective bearings 26 to prevent any lateral movement of the tube or rod 27 in the bearings 26. A lever 29 is fastened to the extension of the lock bar 27 and extends radially therefrom. A control lever 30 is pivotally mounted at its lower end to the upper side of a frame member 18 near the forward end thereof and is connected to the lever 29 by a link 31 which is fastened to the upper end of the lever 29 and midway the length of the handle 30, in such manner that the link 31 will pass over the pivot 32 of the handle as the handle 30 is moved from one extreme position to the other, the handle 30 being adapted to be stopped in its pivotal movement by engaging the horizontal member 18.

A pair of opposed triangular locking members 34 are fixed to the lock bar 27 and extend radially therefrom between the bearings 26. The members 34 are so arranged that their upper edges are inclined downwardly to meet in the longitudinal center of the bar 27 at the surface thereof, thus forming a V-shaped notch, and the outer edge of each member 34 is perpendicular to the lock bar 27 spaced inwardly from the bearings 26 sufficiently to permit the drawbar 22 to be held between the outer edge of the lock 34 and the rear frame member 24 in the raised locking position of the locks 34. In the forward position of the handle 30, the locks 34 are held in the locking position, as seen in the drawings, and by moving the handle 30 upwardly and rearwardly the lever 29 is pivoted rearwardly rotating the member 27 and locks 34 to a position below the point where the lock members 34 may engage the drawbar 22 thus permitting the drawbar 22 to be free to slide on the pivot member 27.

The frame 10 is stabilized and supported by a pair of forwardly extending supporting bars 35 which are fixed to the upper ends of the vertical members 14 on the forward side, and extend downwardly to be secured at their front lower end to a fixed part of the tractor, or a bar as 36 fixed to the tractor, by clamps 37.

In the use and operation of this device, a harrow is fastened to the rear end of the elongated drawbar 22 on the tractor attachment 10 which is fixed to the tractor as described above. When furrow has been planed and the tractor is turned around to plow a second furrow beside the first, the handle 30 is moved rearwardly to unlocked position and the drawbar 22 is moved to the side of the tractor so as to engage the harrow over the ridges besides the furrow. The handle 30 and locks 34 are then moved forward to locked position, thus holding the drawbar 22 at an angle to the tractor 11 so that as the tractor moves beside the first furrow to plow a second, the harrow will smooth the previously plowed ground adjacent the furrows being plowed. When the tractor reaches the end of the second and subsequent ends of the field, the lever 30 and locks 34 are moved to unlocked position and as the tractor circles to turn around, the harrow dragging on the ground will pull the drawbar 22 to the opposite side of the support 10 where it is again locked so that the harrow again is in position to smooth the previously plowed ground.

I do not mean to confine myself to the exact details of construction herein disclosed, but claim all variations falling within the purview of the appended claims.

Having thus described my invention, what I claim is:

1. An attachment of the kind described, comprising a pair of vertical frame members, clamps for securing said vertical members on a tractor, forwardly extending supporting members fixed to said vertical members, means securing said supporting members to the tractor, horizontal rearwardly extending members fixed to said vertical members, a transverse member fixed between said horizontal members, a lock bar rotatably supporting from said horizontal members, means rotatably supported said lock bar below the rear end of said horizontal members, a lever fixed to said lock bar, a control handle, a link between said lever and said handle whereby pivoting movement of said handle effects rotation of said lock bar, said link being fastened to the end of said lever and intermediate the length of said handle, a drawbar pivotally secured to said transverse member and engageable on said pivot member, and a lock member fixed to said lock bar for holding said drawbar on one side thereof, said lock member comprising a plate having an outer edge perpendicular to said lock bar, and spaced inwardly from said bar supporting means.

2. A tractor drawbar attachment comprising a frame, a drawbar pivotally mounted on said frame, a locking bar rockably mounted on said frame for locking said drawbar in a selected pivoted position, and a locking member on said locking bar, said locking member comprising a triangular plate having one edge perpendicular to said locking bar and an inclined edge, said perpendicular edge engageable with said drawbar for locking said drawbar against pivotal movement, and means for rocking said lock bar whereupon said drawbar is free to slide across said lock bar.

3. In a tractor having a drawbar pivotally mounted thereon, means for locking said drawbar in a selected pivoted position, said means including a rockable lock bar transversely of said tractor, a locking plate on said lock bar including an edge perpendicular to said lock bar and an inclined edge, and means for rocking said lock bar to locking or unlocking position, said drawbar being slidable on said inclined edge into locking engagement with said perpendicular edge in the locked position of said locking bar.

4. In a tractor having a drawbar pivotally mounted thereon, means for locking said drawbar in a selected pivoted position, said means including a rockable lock bar across which said drawbar is adapted to slide, locking plates on said drawbar, each of said plates having a vertical edge for locking engagement with said drawbar and an inclined edge on which said drawbar is slidable into engagement with said vertical edge in the locked position of said locking bar, and means for rocking said locking bar.

5. In a tractor having a drawbar pivotally mounted thereon, a rockable lock bar for locking said drawbar in one pivoted position, a pair of opposed triangular plates on said lock bar, each of said plates including a perpendicular edge on the outer ends for locking engagement with the drawbar and a downwardly and inwardly inclined edge for sliding said drawbar into locking engagement with said perpendicular edge in the locked position of said lock bar, and a lever connected to said lock bar for rocking said lock bar to locking or unlocking position.

HAROLD GEORGE BAUER.

REFERENCES CITED

The following references are of record in the file of this patent:

UNITED STATES PATENTS

| Number | Name | Date |
|---|---|---|
| 1,838,865 | Paul | Dec. 29, 1931 |
| 1,842,129 | Thomas | Jan. 19, 1932 |
| 2,357,540 | Palmer | Sept. 5, 1944 |